US009639300B2

(12) United States Patent
Hirose

(10) Patent No.: US 9,639,300 B2
(45) Date of Patent: May 2, 2017

(54) IMAGE FORMING APPARATUS AND METHOD FOR ACTIVATING SCANNED DATA PROCESSOR BASED ON CAPTURED IMAGE

(71) Applicant: Yukinari Hirose, Kanagawa (JP)

(72) Inventor: Yukinari Hirose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 10 days.

(21) Appl. No.: 14/449,692

(22) Filed: Aug. 1, 2014

(65) Prior Publication Data

US 2015/0049361 A1 Feb. 19, 2015

(30) Foreign Application Priority Data

Aug. 19, 2013 (JP) ................................ 2013-169937

(51) Int. Cl.
*G06F 3/12* (2006.01)
*H04N 1/00* (2006.01)

(52) U.S. Cl.
CPC ............ *G06F 3/1204* (2013.01); *G06F 3/126* (2013.01); *G06F 3/1238* (2013.01); *G06F 3/1267* (2013.01); *H04N 1/00336* (2013.01); *H04N 1/00811* (2013.01); *G06F 3/1229* (2013.01)

(58) Field of Classification Search
CPC combination set(s) only.
See application file for complete search history.

(56) References Cited

U.S. PATENT DOCUMENTS

2006/0092455 A1* 5/2006 Maeda ............... H04N 1/00204 358/1.15
2007/0188830 A1* 8/2007 Watanuki ........... H04N 1/00681 358/487
2007/0206211 A1* 9/2007 Okutsu .................. G03G 15/50 358/1.14
2009/0148006 A1* 6/2009 Hayasaki ........... G06K 9/00221 382/118
2014/0126018 A1* 5/2014 Sugimoto ............... G06F 3/013 358/1.15

FOREIGN PATENT DOCUMENTS

JP 2007-279603 10/2007
JP 2009-147452 7/2009

OTHER PUBLICATIONS

Haritaoglu et al. "W4 Real Time Surveillance of People and Their Activities" Aug. 2000, vol. 22.*

* cited by examiner

*Primary Examiner* — Henok A Shiferaw
(74) *Attorney, Agent, or Firm* — Oblon, McClelland, Maier & Neustadt, L.L.P.

(57) ABSTRACT

An image forming apparatus includes an image capture device that captures a user image and generates a captured image, a document holding determination unit that determines whether or not the user appearing in the captured image holds a document based on the captured image, and a scanned data processor that performs processing including scanning the document. The scanned data processor is activated if the document holding determination unit determines that the user holds the document.

20 Claims, 10 Drawing Sheets

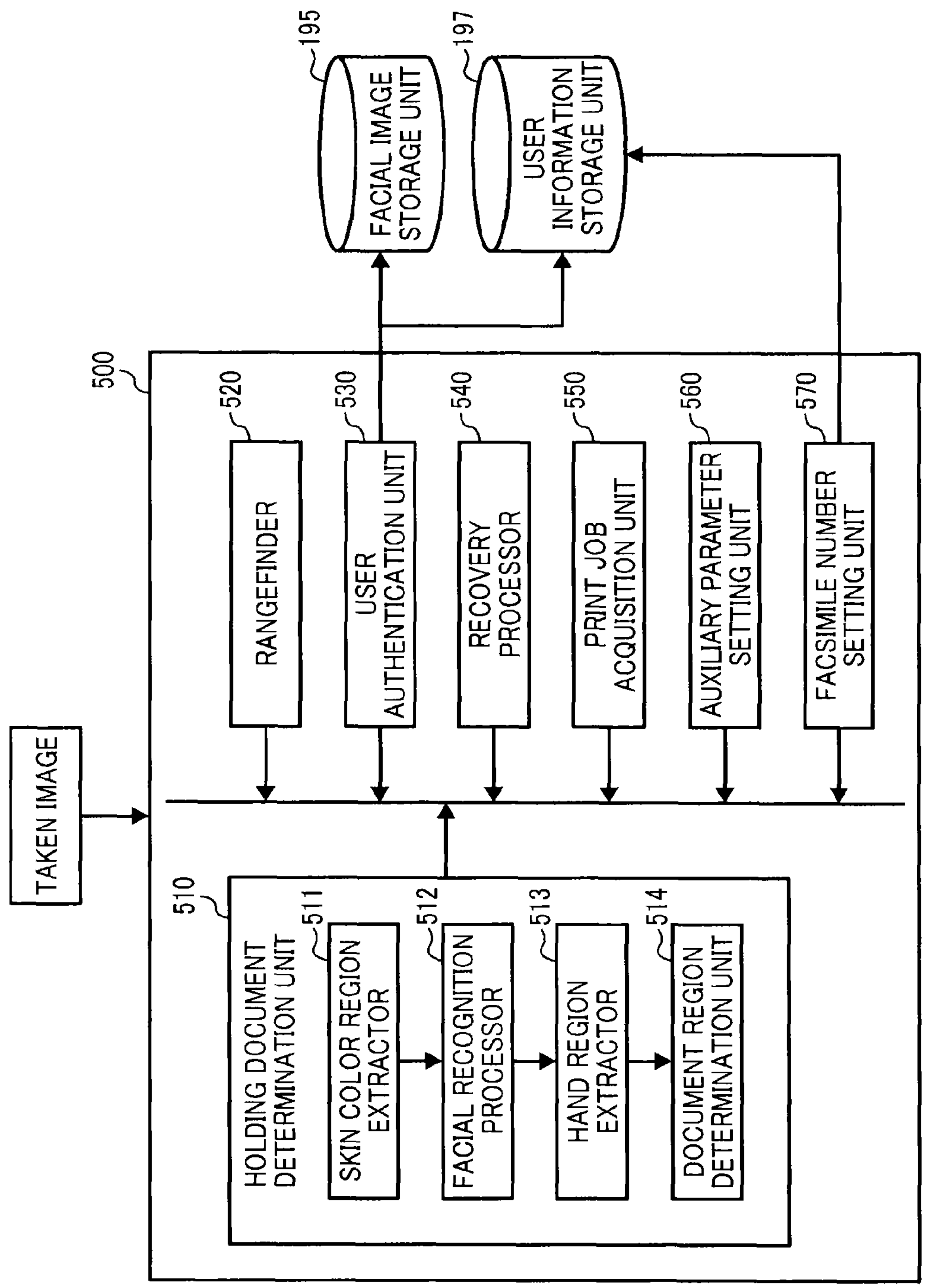
FIG. 5
TAKEN IMAGE
500
510
HOLDING DOCUMENT DETERMINATION UNIT
511
SKIN COLOR REGION EXTRACTOR
512
FACIAL RECOGNITION PROCESSOR
513
HAND REGION EXTRACTOR
514
DOCUMENT REGION DETERMINATION UNIT
520
RANGEFINDER
530
USER AUTHENTICATION UNIT
540
RECOVERY PROCESSOR
550
PRINT JOB ACQUISITION UNIT
560
AUXILIARY PARAMETER SETTING UNIT
570
FACSIMILE NUMBER SETTING UNIT
195
FACIAL IMAGE STORAGE UNIT
197
USER INFORMATION STORAGE UNIT

| USER ID | USER NAME | FACIAL IMAGE FILE |
|---|---|---|
| id001 | AAA | aaa.jpeg |
| id002 | BBB | bbb.jpeg |
| id003 | CCC | ccc.jpeg |

| USER ID | USER NAME | FUNCTIONAL INFORMATION |
|---|---|---|
| id001 | AAA | NO LIMIT (ALL FUNCTIONS ARE AVAILABLE) |
| id002 | BBB | FACSIMILE, COPY |
| id003 | CCC | PRINT, COPY |

FIG. 9

PRINT JOB LIST

| DATE AND TIME | USER NAME | PRINT FILE |
|---|---|---|
| 2013-01-15 15:33 | AAA | aaa.doc |
| 2013-01-16 16:33 | BBB | bbb.doc |
| 2013-01-16 16:35 | CCC | ccc.doc |
| 2013-01-17 17:33 | DDD | ddd.doc |
| 2013-01-17 17:44 | BBB | bbb2.doc |
| 2013-01-18 10:33 | CCC | ccc2.doc |
| 2013-01-18 11:33 | DDD | ddd2.doc |

FIG. 10

| AUXILIARY PARAMETERS | SETTINGS | DETERMINATION BASIS |
|---|---|---|
| PAPER SIZE | A3, B4, A4 | DOCUMENT DIMENSIONS |
| COLOR MODE | COLOR/GRAY SCALE/B/W | PIXEL VALUES IN DOCUMENT |
| DOCUMENT MODE | TEXT MODE/PHOTO MODE | FREQUENCY COMPONENT |

FIG. 11

FACSIMILE COVER LETTER

TO: MR. XYZ

FAX NUMBER: 03-1111-222

[MESSAGE]

| USER ID | USER NAME | FAX NUMBER |
| --- | --- | --- |
| id001 | AAA | 03-1111-2222 |
| id002 | BBB | 03-1111-2222<br>03-1111-3333 |

IMAGE FORMING APPARATUS AND METHOD FOR ACTIVATING SCANNED DATA PROCESSOR BASED ON CAPTURED IMAGE

CROSS-REFERENCE TO RELATED APPLICATION

This patent application is based on and claims priority pursuant to 35 U.S.C. §119 to Japanese Patent Application No. 2013-169937, filed on Aug. 19, 2013 in the Japan Patent Office, the entire disclosure of which is hereby incorporated by reference herein.

BACKGROUND

Technical Field

The present invention relates to an image processing apparatus, an image forming method, and a recording medium storing an image forming program.

Background Art

With increased computerization of information, image processing apparatuses such as printers and facsimiles used for outputting the computerized information and scanners used for computerizing documents have become indispensable. In most cases, these image processing apparatuses are configured as multifunctional peripherals (MFPs) that can be used as a printer, facsimile, scanner, and copier by implementing an image capture function, image forming function, communication function, etc.

In some cases, the image processing apparatuses and multiple terminal devices described above are connected with each other via a Local Area Network (LAN), and multiple users share one image processing apparatus. In those cases, the image processing apparatus authenticates users, limits available functions for each user, and displays an operational screen in accordance with the users.

For example, a technology in which the image forming apparatus includes an image capture device to capture a user image, performs facial recognition based on the captured image, and executes a print job issued by the user has been proposed.

SUMMARY

An example embodiment of the present invention provides a novel image forming apparatus that includes an image capture device that captures a user image and generates a captured image, a document holding determination unit that determines whether or not the user appearing in the captured image holds a document based on the captured image, and a scanned data processor that performs processing including scanning the document. The scanned data processor is activated if the document holding determination unit determines that the user holds the document.

Further example embodiments of the present invention provide an image forming method, and a non-transitory recording medium storing an image forming program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 5 is a block diagram illustrating a functional configuration of an operation controlling program in the image forming apparatus as an embodiment of the present invention.

FIG. 9 is a diagram illustrating a print job list.

FIG. 10 is a diagram illustrating a list of auxiliary parameter types and criteria.

FIG. 11 is a diagram illustrating a facsimile cover letter.

DETAILED DESCRIPTION

Figure 1:
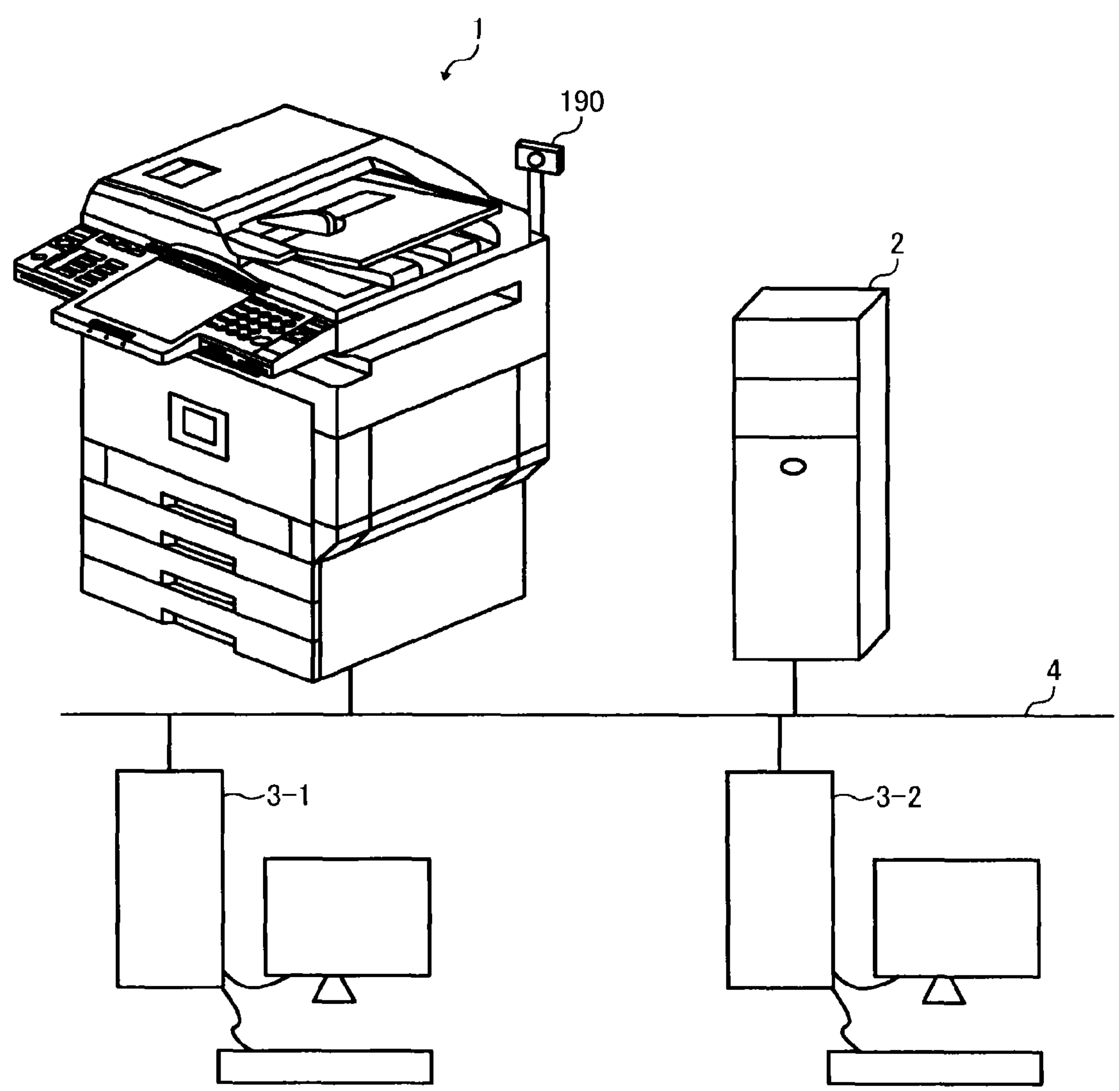
FIG. 1 is a diagram illustrating an image processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the following embodiment, an image processing system in which the image forming apparatus that can be used as the printer, facsimile, scanner and copier (MFP) is shared by multiple users is taken as an example.

Figure 2:
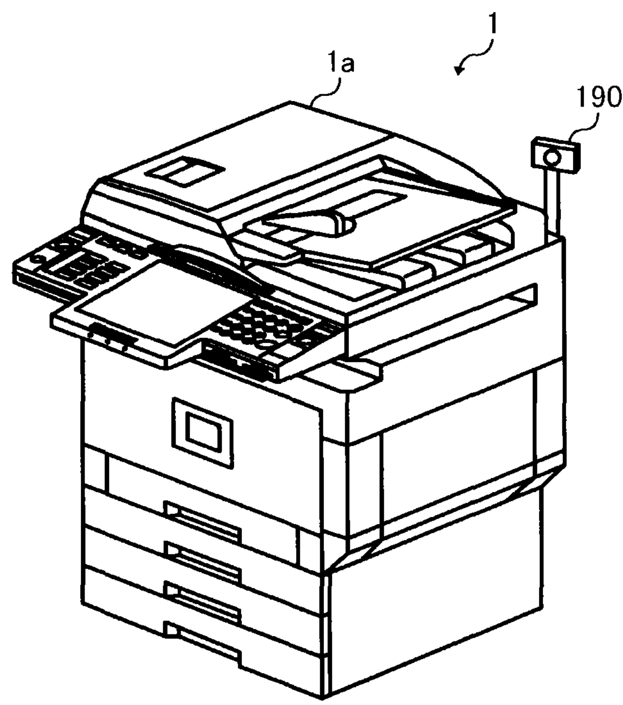
FIG. 2 is a diagram illustrating external view of an image forming apparatus as an embodiment of the present invention.

First, the image processing system and the image forming apparatus in this embodiment is described schematically with reference to FIG. 1 and FIG. 2. FIG. 1 is a diagram illustrating the image processing system in this embodiment, and FIG. 2 is a diagram illustrating external view of the image forming apparatus in this embodiment.

As shown in FIG. 1, in the image processing system in this embodiment, an image forming apparatus 1, a print server 2, and terminal devices 3-1 and 3-2 are connected with each other via a Local Area Network (LAN) 4. A print job issued by the terminal devices 3-1 and 3-2 is stored in the print server 2. Subsequently, the print server 2 transfers the print job to the image forming apparatus 1, and the image formation is performed.

As shown in FIG. 2, the image forming apparatus 1 includes a case 1*a* that includes mechanisms for implementing functions, i.e., printer, facsimile, scanner, and copier and an image capture device 190 equipped on the outer surface of the case 1*a*. That is, the image capture device 190 corresponds to an image capture unit. The image capture device 190 takes an image and generates a user image to be determined whether or not the user holds a document. How it is determined whether or not the user holds a document will be described in detail later.

Figure 3:
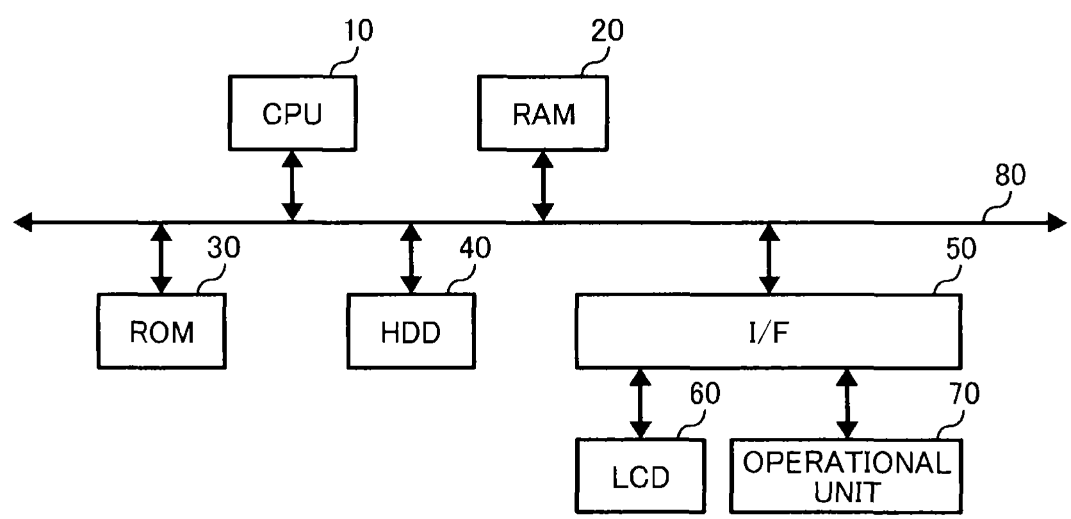
FIG. 3 is a block diagram illustrating a hardware configuration of an information processing device connected to the image processing system as an embodiment of the present invention.

Next, hardware of the information processing apparatuses such as the image forming apparatus 1, the print server 2 and the terminal devices 3-1 and 3-2 included in the image processing system of this embodiment is described below. FIG. 3 is a block diagram illustrating a hardware configuration of the information processing apparatus connected to the image processing system in this embodiment. As shown in FIG. 3, the image forming apparatus 1 in this embodiment includes the same configuration as a general server or PC etc.

That is, in the information processing device connected to the image processing system in this embodiment, a Central Processing Unit (CPU) 10, a Random Access Memory (RAM) 20, Read Only Memory (ROM) 30, a hard disk drive (HDD) 40, and an interface (I/F) 50 are connected with each other via a bus 80. In addition, a Liquid Crystal Display (LCD) 60 and an operational unit 70 are connected to the I/F 50. Besides, in case the information processing apparatus is the image forming apparatus 1, an engine that executes image formation, outputting the image, and scanning and the image capture device 190 are included.

The CPU 10 is a processor and controls the whole operation of the information processing device. The RAM 20 is a volatile storage device that can read/write information at high speed and is used as a work area when the CPU 10 processes information. The ROM 30 is read-only nonvolatile storage device and stores programs such as firmware. The HDD 40 is a nonvolatile storage device that can read/write information and stores the OS, various control programs, and application programs etc.

The I/F 50 connects the bus 80 with various hardware and network, etc. and controls them. The LCD 60 is a visual user interface to check status of the information processing device. The operational unit 70 is a user interface such as a keyboard, mouse, various hardware buttons, and touch panel to input information to the information processing device.

In this hardware configuration described above, programs stored in storage devices such as the ROM 30, HDD 40, and optical discs (not shown in figures) are read to the RAM 20, and a software controlling unit is constructed by executing operation in accordance with the programs by the CPU 10. Functional blocks that implement functions of apparatuses that consist of the image processing system of this embodiment are configured by a combination of the software controlling units described above and hardware.

Figure 4:
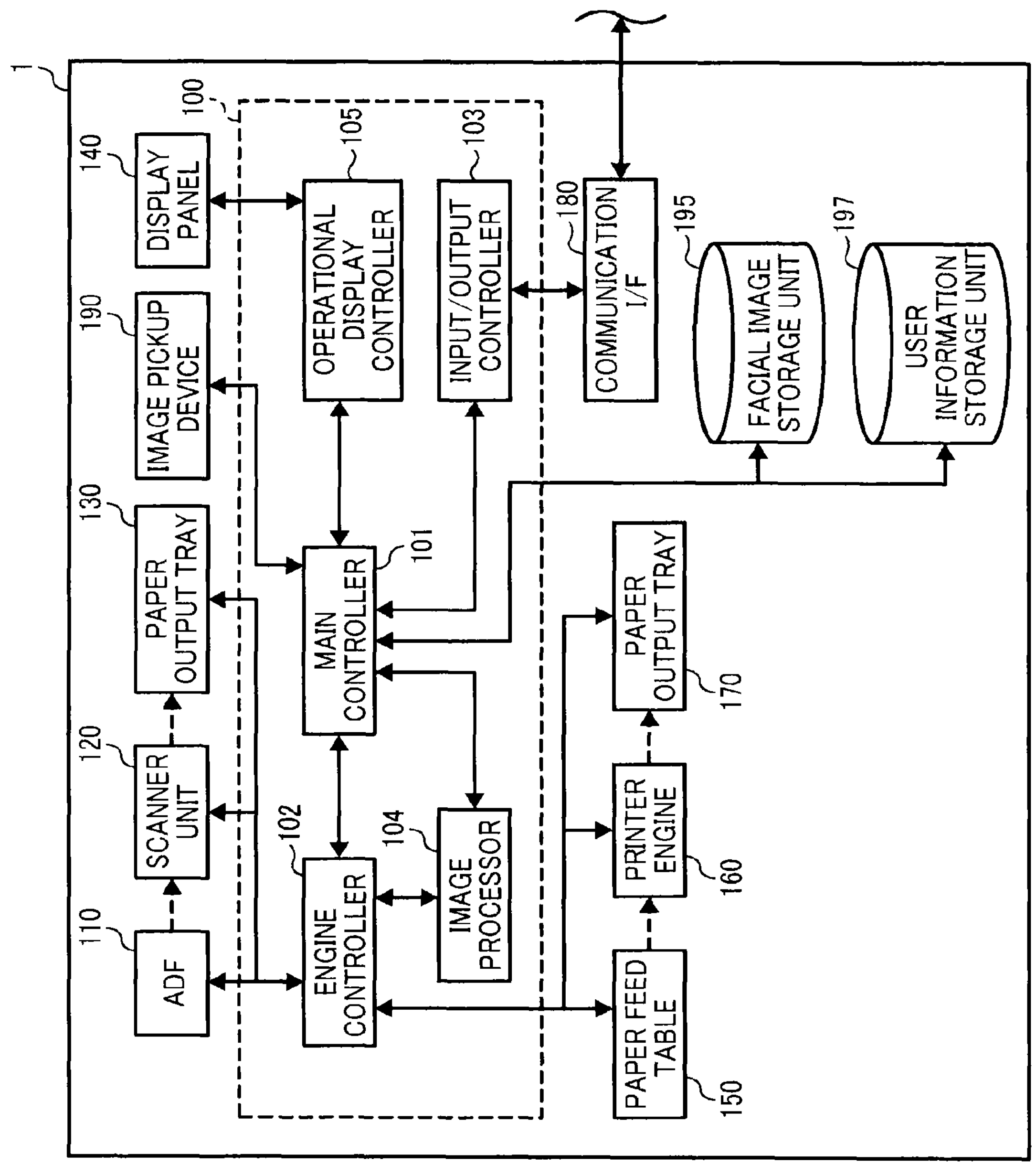
FIG. 4 is a block diagram illustrating a functional configuration of the image forming apparatus as an embodiment of the present invention.

Next, functions of the image forming apparatus 1 in this embodiment are described below. FIG. 4 is a block diagram illustrating a functional configuration of the image forming apparatus 1. As shown in FIG. 4, the image forming apparatus 1 includes a controller 100, an Auto Document Feeder (ADF) 110, a scanner unit 120, a paper output tray 130, a display panel 140, a paper feed table 150, a print engine 160, a paper output tray 170, a communication I/F 180, the image capture device 190, a facial image storage unit 195, and a user information storage unit 197.

The controller 100 includes a main controller 101, an engine controller 102, an input/output controller 103, an image processor 104, and an operational display controller 105. As shown in FIG. 4, the image forming apparatus 1 in this embodiment is constructed as the MFP that includes the scanner unit 120 and the print engine 160. In FIG. 4, solid arrows indicate electrical connections, and dashed arrows indicate flow of paper.

The display panel 140 is both an output interface that displays status of the image forming apparatus 1 visually and an input interface (operational unit) to operate the image forming apparatus 1 directly or input information to the image forming apparatus 1. The communication I/F 180 is an interface that the image forming apparatus 1 communicates with other apparatuses by wired communication or wireless communication, and interfaces such as Ethernet, USB interface, a modular jack, Bluetooth, Wireless Fidelity (Wi-Fi) and FeliCa are used for the communication I/F 180.

The image capture device 190 is configured using a digital camera that generates the captured image by taking an image of the user. Here, the captured image can be either a still image or one frame of a movie recorded at 30 frames per second (fps).

In case of controlling the operation of the image forming apparatus 1 by using the movie, while the main power of the image forming apparatus 1 is turned on, by keeping recording the movie (through image) by the image capture device 190 and determining whether or not the user holds a document using either each frame of the movie or frames skipped appropriately at predetermined interval, the image forming apparatus 1 can recover from standby mode (energy saving mode) immediately. By contrast, in case of controlling the operation of the image forming apparatus 1 by using the still image, it is possible that the image forming apparatus 1 includes a human detecting sensor and takes a still image using the image capture device 190 after the human detecting sensor detects a human. In case of using the movie, it is possible to ensure real-time processing compared to the still image. By contrast, in case of using the still image, taking the still image and determining whether or not the user holds a document based on the taken still image are performed only when a human comes close to the image forming apparatus 1. Therefore, it is unnecessary to perform processing if a human does not exist around the image forming apparatus 1, and that can save energy much more compared to using the movie.

A facial image of a human to be registered as a user (operator) of the image forming apparatus 1 is taken preliminarily and stored in the facial image storage unit 195. The user information storage unit 197 stores information on each user to be registered as a user of the image forming apparatus 1, e.g., an available function list that specifies functions available to users and a facsimile number list (corresponding to a telephone number registered data) that indicates destination numbers of facsimile registered for each user. In this embodiment, the image forming apparatus 1 includes the facial image storage unit 195 and the user information storage unit 197. However, it is possible to store those information in a database server connected to the LAN 4 and refer them when the image forming apparatus 1 authenticates the user.

The controller 100 combines software and hardware. In particular, control programs such as firmware stored in nonvolatile storage devices such as the ROM 30 and the HDD 40 are loaded into the RAM 20, and the software controlling unit is implemented by executing operations by the CPU 10 in accordance with the programs. The controller 100 is constructed of the software controlling unit and hardware such as integrated circuits. The controller 100 functions as a controller that controls the whole part of the image forming apparatus 1.

The main controller 101 controls each unit included in the controller 100 and commands each unit in the controller 100. The engine controller 102 controls and drives the print engine 160 and the scanner unit 120. The input/output controller 103 inputs signals and commands input via the communication I/F 180 and the wireless communication unit 190 to the main controller 101. In addition, the main controller 101 controls the input/output controller 103 and accesses other apparatuses such as the mobile device 2 via the communication I/F 180 and the wireless communication unit 190.

The image processor 104 generates drawing information based on image information to be printed and output under the control of the main controller 101. The drawing information is information that the print engine 160 as an image forming unit draws as an image to be formed in an image forming operation. The image processor 104 processes image capture data input from the scanner unit 120 and generates image data. The generated image data is stored in the image forming apparatus 1 as a result of the scanner operation or transferred to another apparatus via the communication I/F 180 and the wireless communication unit 190. The operational display controller 105 displays information on the display panel 140 and reports information input via the display panel to the main controller 101.

If the image forming apparatus 1 functions as the printer, first, the input output controller 103 receives a print job via the communication I/F 180. The input/output controller 103 transfers the received print job to the main controller 101. After receiving the print job, the main controller 101 generates the drawing information based on the document information and image information included in the print job by controlling the image generator 104. After the image generator 104 generates the drawing information, the engine controller 102 executes image formation on paper carried from the paper feed table 150 based on the generated drawing information. As particular examples of the print engine 160, image forming mechanisms such as inkjet method and electrophotography method can be used. After the print engine 160 forms the image on the paper, the paper is ejected on the paper output tray 170. As described above, components necessary for executing the print job and forming an image on recording paper are referred to as printer unit collectively.

If the image forming apparatus 1 functions as a scanner, in response to a command to execute scanning input by operation on the display panel 140 or from an external apparatus via the communication I/F 180, the operational display controller 105 or the input/output controller 103 transfers a signal to execute scanning to the main controller 101. The main controller 101 controls the engine controller 102 based on the received signal to execute scanning. The engine controller 102 drives the ADF 110 and carries a document to be scanned set on the ADF 110 to the scanner unit 120. In addition, the engine controller 102 drives the scanner unit 120 and scans the document carried from the ADF 110. If the document is not set on the ADF 110 and the document is set on the scanner unit 120 directly, the scanner unit 120 scans the set document under the control of the engine controller 102.

In scanning operation, an image capture device such as CCD included in the scanner unit 120 scans the document optically, and image capture information is generated based on the optical information. The engine controller 102 transfers the image capture information generated by the scanner unit 120 to the image processor 104. The image processor 104 generates the image information based on the image capture information received from the engine controller 102 under the control of the main controller 101. The image information generated by the image processor 104 is stored in the storage device such as the HDD 40 attached to the image forming apparatus 1. The image information generated by the image processor 104 is either stored in the HDD 40 etc. as is or transferred to an external apparatus by the input/output controller 103 via the communication I/F 180 depending on the user command.

If the image forming apparatus 1 functions as a copier, the image processor 104 generates the drawing information based on either the image capture information received from the scanner unit 120 by the engine controller 102 or the image information generated by the image processor 104. Similarly as the printer operation, the engine controller 102 drives the print engine 160 based on the drawing information. As described above, components necessary for operating the image forming apparatus 1 as the copier are referred to as a copying unit collectively.

If the image forming apparatus 1 functions as a facsimile transmitter/receiver, the image forming apparatus 1 is connected to a Private Branch eXchange (PBX) or an ISDN circuit via the communication I/F 180. Subsequently, the image forming apparatus 1 transfers/receives a facsimile document to/from the party at the other end connected to the PBX or the ISDN circuit via the communication I/F 180. As described above, components necessary for operating the image forming apparatus 1 as the facsimile transmitter/receiver are referred to as a facsimile unit collectively. Each of the printer unit, scanner unit, copier unit, and facsimile unit corresponds to a scanned data processor.

Figures 6, 7, 8:
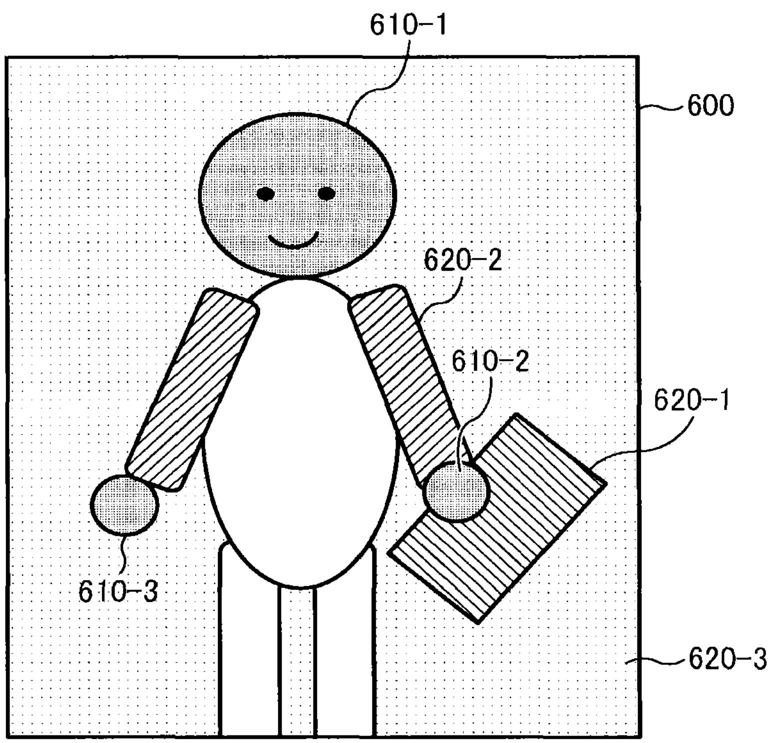
FIG. 6 is a block diagram illustrating a process performed by a document holding determination unit.
FIG. 7 is a diagram illustrating a facial image list.
FIG. 8 is a diagram illustrating an available function list.
Figures 12, 13:
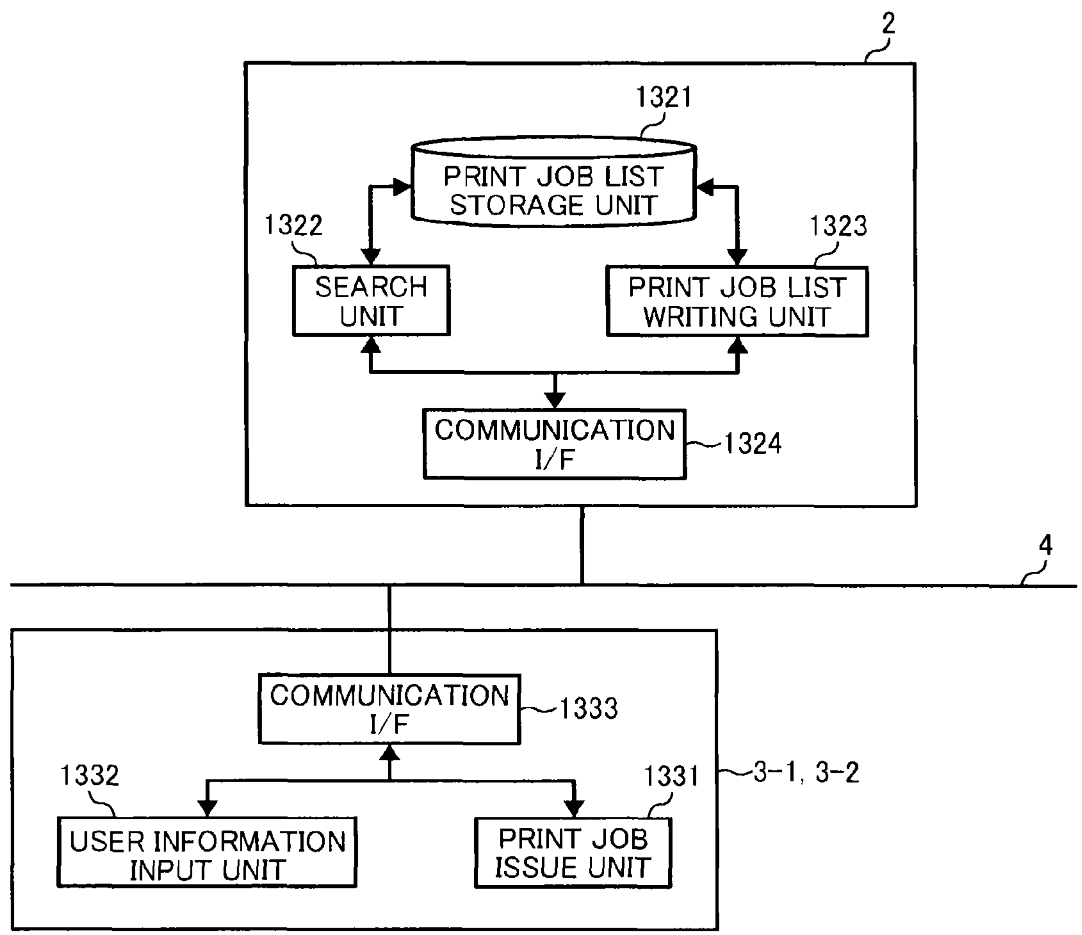
FIG. 12 is a diagram illustrating a facsimile number list.
FIG. 13 is a schematic diagram illustrating a configuration of a print server and a terminal device as an embodiment of the present invention.

Next, a functional configuration of an operation controlling program in the image forming apparatus 1 of this embodiment is described below with reference to from FIG. 5 to FIG. 12. FIG. 5 is a block diagram illustrating a functional configuration of an operation controlling program in the image forming apparatus of this embodiment. FIG. 6 is a block diagram illustrating a process performed by a document holding determination unit. FIG. 7 is a diagram illustrating a facial image list. FIG. 8 is a diagram illustrating an available function list. FIG. 9 is a diagram illustrating a print job list. FIG. 10 is a diagram illustrating a list of auxiliary parameter types and criteria. FIG. 11 is a diagram illustrating a facsimile cover letter. FIG. 12 is a diagram illustrating a facsimile number list.

As shown in FIG. 5, the operation controlling program 500 in this embodiment includes a document holding determination unit 510, a rangefinder 520, a user authentication unit 530, a recovery processor, a print job acquisition unit 550, an auxiliary parameter setting unit 560, and a facsimile number setting unit 570. The operation controlling program shown in FIG. 5 implements functions by being executed by the main controller 101 included in the image forming apparatus 1.

After acquiring a captured image from the image capture device 190, the document holding determination unit 510 determines whether or not a user holds a document based on the captured image. The document holding determination unit 510 includes a skin color region extractor 511, a facial recognition processor 512, a hand region extractor 513, and a document region determination unit 514.

The skin color region extractor 511 extracts a skin color region from the captured image acquired from the image capture device 190. The skin color region extractor 511 extracts the skin color region by extracting pixels that has pixel values of skin color based on pixel values of pixels included in the captured image. If a user's upper body appears in the captured image, the user's face or hand can be taken in the captured image in some cases. In that case, the face region and hand region are extracted.

The facial recognition processor 512 recognizes a face region where the user face appears in the captured image acquired from the image capture device 190. As an example of the facial recognition process, an outline extraction process and a black eye extraction process are performed on the skin color region extracted by the skin color region extractor 511. In addition, it is possible to prepare for standard facial patterns preliminarily and perform a pattern matching process on the skin color region. It should be noted that it is necessary for the facial recognition processor 512 to detect a user face, and it is unnecessary to recognize users individually.

The hand region extractor 513 extracts the hand region where the user hand appears in the captured image acquired from the image capture device 190. As an example of the hand region extraction process, it is possible to extract the hand region that is not recognized as the facial region from the skin region extracted already. For example, in a captured image 600 shown in FIG. 6, the skin color region extractor 511 extracts three skin color regions 610-1, 610-2, and 610-3. Subsequently, the facial recognition processor 512 performs the facial recognition process on each of the skin color regions and recognizes that the skin color region 610-1 corresponds to the facial region. Based on these results described above, the hand region extractor 513 extracts two skin color regions 610-2 and 610-3 except the skin color region 610-1 determined as the facial region among three skin color regions 610-1, 610-2, and 610-3.

Next, after extracting a closed region that touches the hand region, the document region determination unit 514 determines whether or not the closed region corresponds to a document region where a document is taken based on image characteristics such as pixel values, region size, and outline shape in the closed region. As an example of the process performed by the document region determination unit 514, assuming that a background color in the document is white, the document region determination unit 514 extracts a white color region touching the extracted hand region. Subsequently, after extracting outline in the white color region, the document region determination unit 514 determines whether or not the outline shape is a square closed outline. If the outline shape is the square closed outline, it is determined that the user holds a document.

In the above description, the document region determination unit 514 performs the white extraction process assuming that the user holds white paper. However, it is possible that the document is not white. In that case, the document region determination unit 514 performs a region expansion process based on the pixel value that touches the extracted hand region and searches for a closed region whose color is same. If the closed region is found, after performing the outline extraction process in the closed region, it is possible to determine whether or not the extracted outline shape corresponds to the square closed outline. For example, in FIG. 6, the document region determination unit 514 detects the pixel value of the document, the pixel value that indicates color of clothes that the user wears, and the pixel value that indicates paper color as the pixel values that touch the hand region. After performing the region expansion process for each pixel value, the document region determination unit 514 can extract a region 620-1 that indicates the pixel value of the document, a region 620-2 that indicates the pixel value of the clothes, and a background region 620-3. In the background region 620-3, outline edge is different from image edge. In this case, by not considering the background region 620-3 as the closed region, candidates for the document region can be narrowed down to the region 620-1 that indicates the pixel value of the document and the region 620-2 that indicates the pixel value of the clothes. In determining the outline shapes in these regions, the region 620-1 that indicates the pixel value of the document approximates to the square closed region, and the region 620-2 that indicates the pixel value of the clothes differs from the square closed region. Consequently, the region 620-1 that indicates the pixel value of the document can be determined as the document region.

In the process determining shapes described above, by superimposing the hand region that holds the document with the document region, it is possible that the document region cannot be the square shape precisely. In this case, if a ratio of a size of the hand region to a size of the document region is equal to or less than a predetermined value, it is determined that the hand region is hiding the document region, and it is possible to approximate the outline of the document region to the square shape including a part of the hand region.

Otherwise, in another process performed by the document region determination unit 514, instead of determining whether or not it is the square closed region, it is possible to extract the closed region that touches the hand region and extract straight lines by performing Hough transform on the closed region. If more than four lines are extracted, it is possible that the document region determination unit 514 recognizes the closed region as the document region and determines that the user holds the document. In this case, if the image is taken when the user hand covers the document, it can be difficult that the document is recognized as the square shape. However, if more than four straight lines are detected, assuming that the closed region to be recognized corresponds to the square shape, it is easy to recognize it as the document region. It is just an example that the number of straight lines for assuming the square shape is equal to or more than four, and it is not limited to that. By considering that the number of straight lines for assuming the square shape is equal to or more than four, it is possible to recognize as the document region even if the corner of the document is folded and the document is taken as the shape approximating to a pentagon in the captured image.

In order to improve precision of the document holding determination process, it is possible to take a standard image that a user is not taken preliminarily, generate a differential image making a difference between the captured image taken by the image capture device 190 and the standard image, and perform the skin color extraction process, the facial recognition process, the hand region extraction process, and the document region determination process on the differential image. Consequently, if there is a calendar, poster or document whose size is recognized as paper by the image forming apparatus 1 on a wall in the background of the user, it is possible to prevent from recognizing them as the document by mistake.

If shadow appears in the captured image, it is possible that the actual same color is taken as a different pixel value in the captured image. Therefore, in the skin color region extractor 511, the hand region extractor 513, and the document region determination unit 514, regarding a pixel value as a basis of the skin color extraction process, the white color extraction process, and the region expansion process, it is possible to configure that whose pixel values within a predetermined region centering on the standard value are recognized as the same color.

The document holding determination process described above is an example, and the skin color region extractor 511, the hand region extractor 513, and the document region determination unit 514 are not mandatory. Any process that determines whether or not the user holds the document based on the captured image can be included in the document holding determination process in the present invention. For example, it is possible to determine only shape on the differential image, extract the document region, and determine whether or not the user holds the document or not.

The rangefinder 520 measures distance between the image forming apparatus 1 and the user appearing by the image capture unit 190. As an example of the measuring method, a facial region $S_{th}$ included in the captured image that takes an adult with standard proportions at a position away from the image forming apparatus 1 at predetermined distance ($L_{th}$) is measured preliminarily and stored. Subsequently, after calculating a facial region S extracted by the facial recognition processor 512, the distance between the taken user and the image forming apparatus 1 can be measured from Equation 1 shown below.

Equation 1

$$L = L_{th} + \frac{S}{S_{th}} \tag{1}$$

In Equation 1 shown above, it is assumed that L is measured distance, $L_{th}$ is the predetermined distance, S is the actual measured facial region taken in the captured image, and $S_{th}$ is the facial region included in the captured image that takes an adult with standard proportions at a position away from the image forming apparatus 1 at predetermined distance $L_{th}$.

It is preferable to secure distance that can assure time needed to recover from the energy saving mode $t_{rec}$ if the user approaches the image forming apparatus 1 at standard moving velocity in the office $V_{ave}$ ($V_{ave} \times t_{rec}$) for the predetermined distance $L_{th}$ described above. Consequently, it is possible that the image forming apparatus 1 finishes recovering from the energy saving mode when the user reaches the image forming apparatus 1 and execute the copying function and the facsimile function, and that can reduce the user's waiting time.

In case of including the human detecting sensor that works with the image capture device 190, it is possible to use the detecting result of the human detecting sensor for the measuring result of the rangefinder 520. Consequently, it is possible to assume distance from the image forming apparatus 1 to the detecting limit of the human detecting sensor as the predetermined distance $L_{th}$.

The user authentication unit 530 recognizes users taken in the captured image individually. As an example of the user authentication process, the user authentication unit 530 recognizes users taken in the captured image individually by calculating facial characteristics such as positional relationship of components such as eye, nose, and ear and jaw outline and comparing them with the facial images stored in the facial image storage unit 195. User identification information (user ID) for recognizing users individually, user names, and facial image data taking each user's face preliminarily are associated with each other and stored in the facial image list shown in FIG. 7. The user authentication unit 530 recognizes users individually by checking the characteristics extracted from the captured image with the facial image data registered in the facial image list.

Furthermore, with reference to users who utilize the image forming apparatus 1 configured for each of the users, the user authentication unit 530 allows to perform available functions only in accordance with the user authority. In a user authority list shown in FIG. 8, user authority for functions included in the image forming apparatus 1 is specified for each user. The user ID, user names, and available functions included in the image forming apparatus for each user are associated with each other and stored in the user authority list shown in FIG. 8. The user authority list corresponds to user authority data.

In accordance with the determination result by the document holding determination unit 510, the recovery processor 540 outputs a signal for waking the image forming apparatus 1 up from the energy saving mode to the engine controller 102 and the operational display controller 105. The recovery processor 540 outputs the instruction signal for starting up the print engine 160, the ADF 110 and the scanner unit 120 to the engine controller 102. The recovery processor 540 outputs the instruction signal for displaying a screen for copying or sending facsimile to the operational display controller 105.

The print job acquisition unit 550 queries the print server 2 whether or not there is a print job, acquires the print job from the print server 2, and outputs the print job to the image processor 104. Issued date/time of the print job, user names, and print files are associated with each other and stored in the print job list shown in FIG. 9. The print job acquisition unit 550 queries the print server 2 via the communication I/F 180 whether or not there is a print job issued by the user authenticated by the user authentication unit 530. The print server 2 searches for the print job issued by the user. If there is the user's print job, the print server 2 transfers the print job to the print job acquisition unit 550. If not, the print server 2 transfers data that indicates there is no such print job. In this embodiment, after the recovery processor 540 has the apparatus recover from the energy saving mode, the print job acquisition unit 550 queries the print server 2. However, if the image forming apparatus 1 does not implement the energy saving mode, it is possible to configure that the image forming apparatus 1 queries the print server 2 in case the document holding determination unit 510 determines that the user does not hold the document.

The auxiliary parameter setting unit 560 configures auxiliary parameters used in accordance with document types in operating the copying unit and the facsimile transferring unit based on the image characteristics of the document region included in the captured image. It is possible to configure auxiliary parameters based on image characteristics of the document region such as the size of the document region, pixel values, and frequency etc. In this embodiment, as shown in FIG. 10, three parameters, paper sizes, color modes (color/monochrome), and document modes (text/photo), are configured as the auxiliary parameters.

In this embodiment, three parameters, A3, B4, and A4 are used as the setting values for the paper sizes. Size of facial region of the adult with standard proportions included in the captured image $S_{th}$, distance when the region $S_{th}$ is measured $L_{th}$, and sizes of paper regions of A3, B4, and A4 sized paper included in the captured image taken at the distance $L_{th}$ MA3, MB4, and MA4 are associated with each other and stored preliminarily.

Based on Equation 2 shown below, it is possible to correct the size of the paper region included in the captured image by using the distance $L_{th}$, comparing the correcting value $M_c$ with MA3, MB4, and MA4, and configure the nearest document size as the paper size parameter.

Equation 2

$$M_c = M\frac{S}{S_{th}} \tag{2}$$

In Equation 2 shown above, it is assumed that $M_c$ is the corrected document region, M is the actual measured document region taken in the captured image, S is the actual measured facial region taken in the captured image, and $S_{th}$ is the facial region included in the captured image that takes an adult with standard proportions at a position away from the image forming apparatus 1 at predetermined distance $L_{th}$.

If the corrected value $M_c$ is larger than MA3, MB4, and MA4, usually the document that the user holds exceeds the document sizes that can be handled by the image forming apparatus 1 such as posters and simili paper. In that case, the document holding determination unit 510 can determine that the user does not hold the document. If the correct value $M_c$ is smaller than MA3, MB4, and MA4 at a predetermined ratio, it is possible that the document that the user holds is smaller than the document sizes that can be handled by the image forming apparatus 1 such as memos and employee ID cards. In that case, the document holding determination unit 510 can also determine that the user does not hold the document.

Furthermore, the auxiliary parameter setting unit 560 can determine that the document is either color or monochrome based on the pixel values in the document region and configure either color mode or monochrome mode as the auxiliary parameter. For example, if the pixel values in the paper region correspond to black/white binary image, monochrome mode can be configured as the auxiliary parameter. If the pixel values in the paper region correspond to white, black, and gray, grayscale can be configured as the auxiliary parameter. If the pixel value in the paper region is red, blue, and green, color mode can be configured as the auxiliary parameter.

The auxiliary parameter setting unit 560 can perform Fast Fourier Transform on the document region and determine text mode or photo mode as the auxiliary parameter based on the frequency component. Generally, it is predicted that high-frequency component is detected in the photo mode compared to the text mode. Therefore, it is possible to configure a standard value using the frequency component preliminarily and configure the photo mode in case of detecting more high-frequency component compared to the standard value and the text value in case of detecting less high-frequency component compared to the standard value. Otherwise, after performing a character recognition process by the auxiliary parameter setting unit 560, it is possible to configure the text mode in case of recognizing texts and the photo mode in case of recognizing no texts.

In another case, the auxiliary parameter setting unit 560 includes a character recognition unit and performs the character recognition process on the document region. In case of recognizing characters, text mode can be configured. In case of not recognizing characters, photo mode can be configured.

After performing the character recognition process on the document region, in case of extracting string "FAX" or "Facsimile" and a digit sequence, the facsimile number setting unit 570 outputs the digit sequence as the telephone number to the input/output controller 103 and configures it as the facsimile destination. As shown in FIG. 11, usually, a facsimile cover letter includes text information that indicates the facsimile document such as "FAX" and "Facsimile". Therefore, if the facsimile number setting unit 570 detects text information that indicates the facsimile document, the image forming apparatus 1 starts preparing for sending facsimile. In addition, if the digit sequence is detected from the facsimile cover letter, the digit sequence is configured as the destination facsimile number.

As shown in FIG. 12, it is possible to generate a facsimile number list that registers telephone numbers as candidates for facsimile destinations for each user preliminarily and store the facsimile number list in the image forming apparatus 1. The user ID, user names, and destination facsimile numbers registered by the user preliminarily are associated with each other and stored in the facsimile number list. Subsequently, the facsimile number setting unit 570 checks the facsimile number registered for the user authenticated by the user authentication unit 530 in the facsimile number list with the facsimile number recognized by the character recognition process. It is possible to determine the checked telephone number as the facsimile destination. Consequently, it is possible to complement the precision of the character recognition process and configure more reliable destination telephone number.

Next, a schematic configuration of the print server 2 and terminal devices 3-1 and 3-2 is described below with reference to FIG. 13. FIG. 13 is a block diagram illustrating a schematic configuration of the print server and the terminal device. As shown in FIG. 13, the print server 2 includes a print job list storage unit 1321 (corresponding to print job storage unit) that stores the print job list shown in FIG. 9, a search unit 1322 that searches through the print job list, extracts a print job that the image forming apparatus 1 inquires if the print job exists in the print job list, and transfers the print job to the image forming apparatus 1, a print job list writing unit 1323 that receives the print job from the terminal devices 3-1 and 3-2 and writes the print job in the print job list, and a communication I/F 1324 that connects to the LAN 4.

The terminal devices 3-1 and 3-2 include a print job issue unit 1331 that issues the print job, a user information input unit 1332 that inputs and edits the available function list shown in FIG. 8, the print job list shown in FIG. 9, and the facsimile number list shown in FIG. 12, and a communication I/F 1333 that connects to the LAN 4.

The image forming apparatus 1 (not shown in FIG. 13) is also connected to the LAN 4, and the print job is transferred/received among the image forming apparatus 1, the print server 2, and the terminal devices 3-1 and 3-2.

Figure 14:
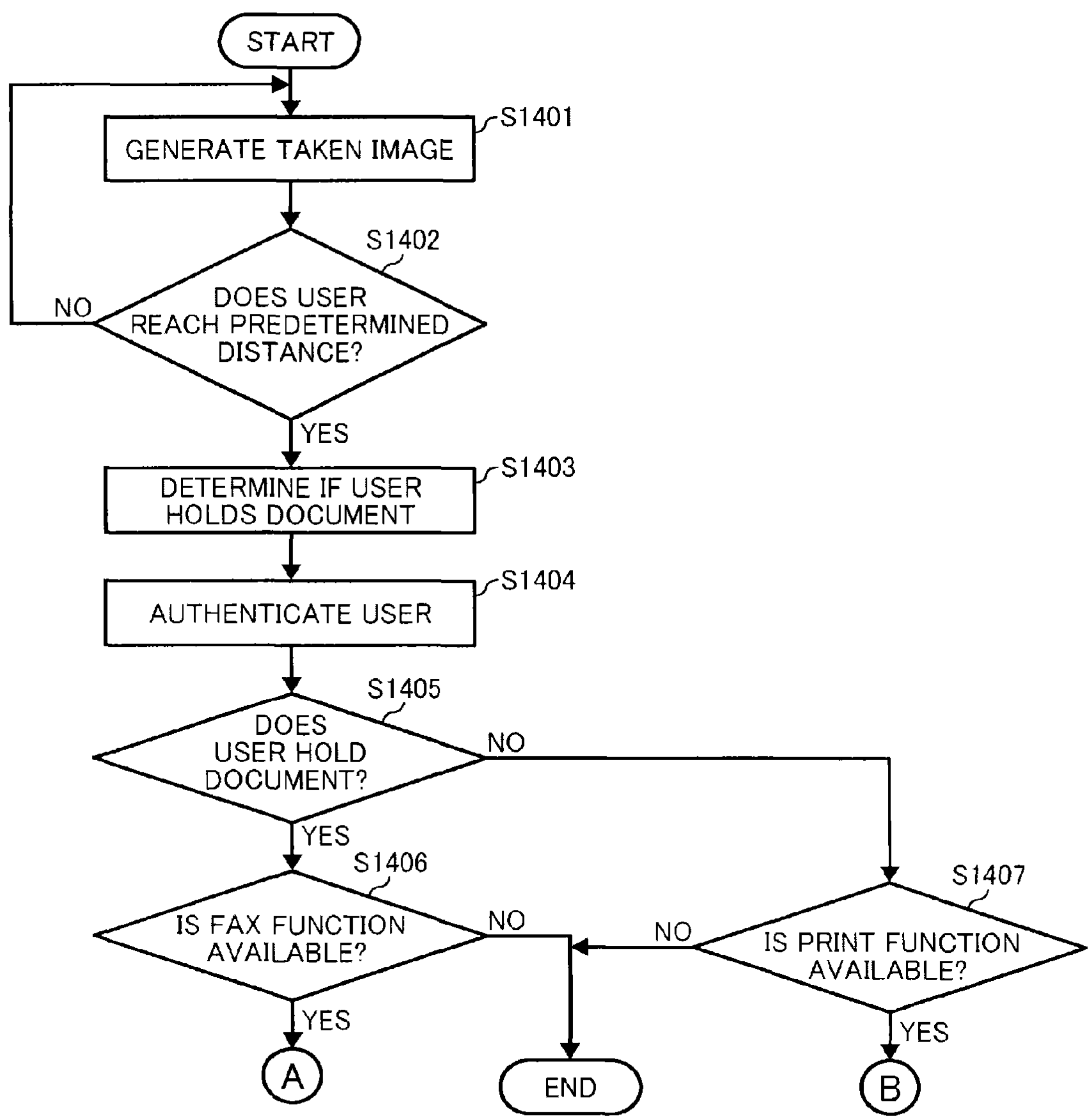
FIG. 14 is a flowchart illustrating a first-half process performed by the image forming apparatus as an embodiment of the present invention.
Figure 15:
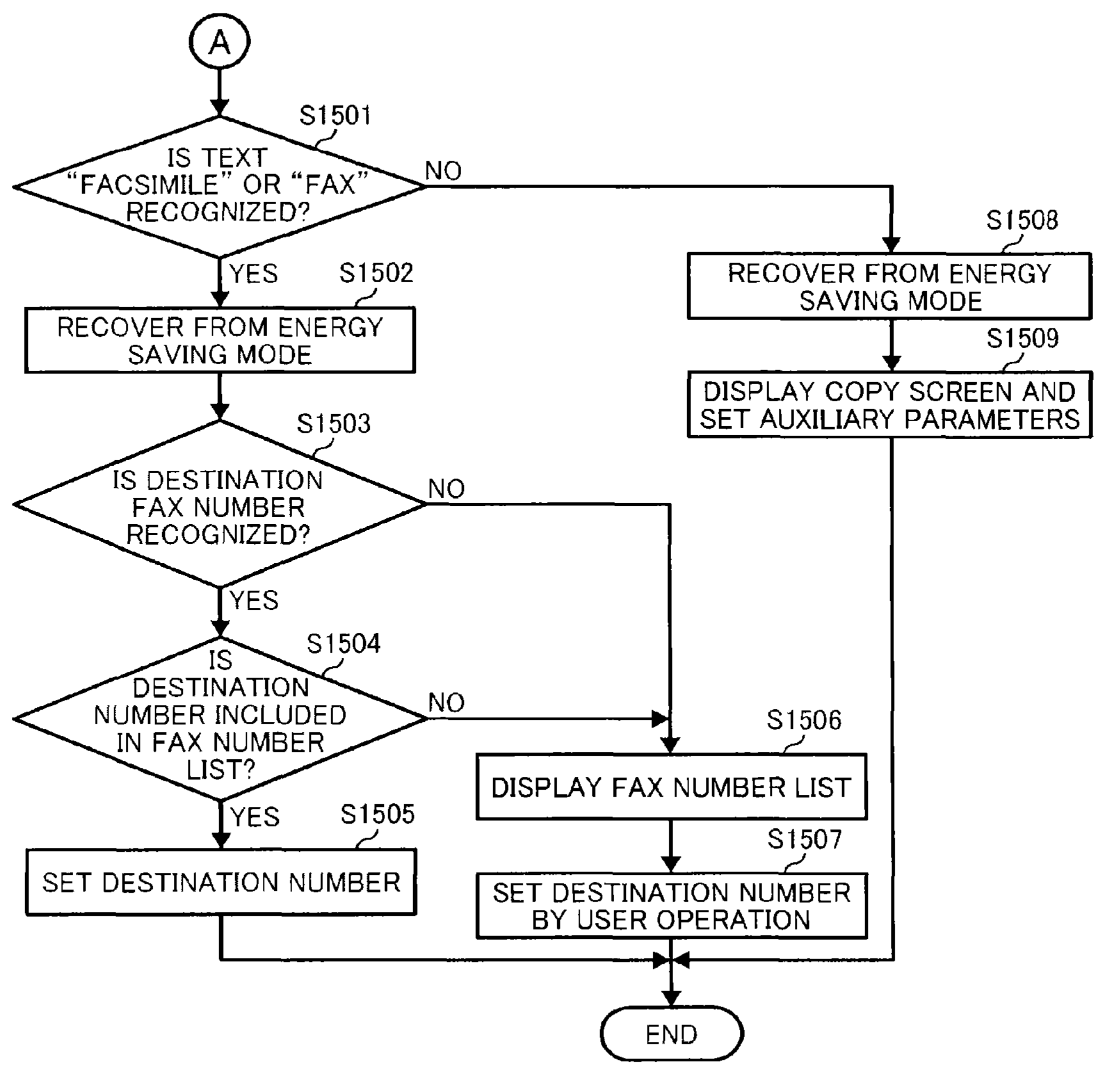
FIG. 15 is a flowchart illustrating a process performed by the image forming apparatus after determining that a facsimile function is available as an embodiment of the present invention.
Figure 16:
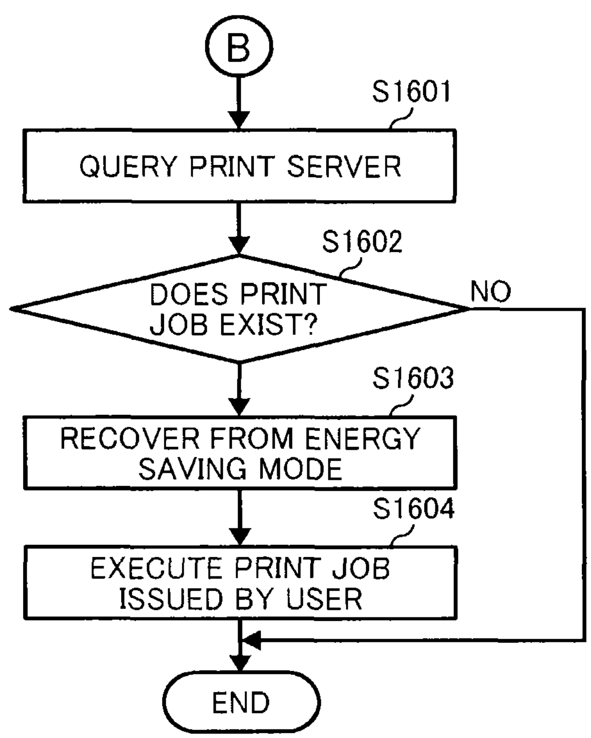
FIG. 16 is a flowchart illustrating a process performed by the image forming apparatus after determining that a printing function is available as an embodiment of the present invention.

Next, operational flow of the image forming apparatus 1 in this embodiment is described below with reference to FIG. 14, FIG. 15 and FIG. 16. FIG. 14 is a flowchart illustrating a first-half process performed by the image forming apparatus in this embodiment. FIG. 15 is a flowchart illustrating a process performed by the image forming apparatus after determining that a facsimile function is available in this embodiment. FIG. 16 is a flowchart illustrating a process performed by the image forming apparatus after determining that a printing function is available in this embodiment. The process is described below along with steps sequentially with reference to FIG. 14, FIG. 15 and FIG. 16.

The image capture device 190 generates the captured image in S1401. The rangefinder 520 measures the distance between the user appearing in the captured image and the image forming apparatus 1. If the distance is larger than the predetermined distance (NO in S1402, the user does not reach a predetermined distance from the image forming apparatus 1), the image capture device 190 generates the captured image. If the distance is equal to or less than the predetermined distance (YES in S1402, the user reaches a predetermined distance from the image forming apparatus 1), the document holding determination unit 510 performs the document holding determination process in S1403. Subsequently, the user authentication unit 530 authenticates the user appearing in the captured image individually and acquires the user authorization information in S1404. If the user holds the document (YES in S1405) and the facsimile function is not available (NO in S1406), the image forming apparatus 1 does not start preparing for the operation. Similarly, if the user does not hold the document (NO in S1405) and print function is not available (NO in S1407), the image forming apparatus 1 does not start preparing for the operation either.

If the user holds the document (YES in S1405) and the facsimile function is available (YES in S1406), the facsimile number setting unit 570 performs the character recognition process on the document region included in the captured image. Subsequently, if the text information that indicates the facsimile document is recognized (YES in S1501), the recovery processor 540 wakes the image forming apparatus 1 up from the energy saving mode in S1502. Furthermore, if the telephone number is recognized after the facsimile number setting unit 570 performs the character recognition process on the document region (YES in S1503), the facsimile number setting unit 570 refers to the facsimile number list. If the number acquired by performing the character recognition process matches the telephone number included in the facsimile number list (YES in S1504), the acquired number is configured as the destination telephone number in S1505. If the telephone number is not recognized (NO in S1503) or the number acquired by performing the character recognition process does not match the telephone number included in the facsimile number list (NO in S1504), the facsimile number setting unit 570 displays the facsimile number list of the authenticated user on the LCD 60 in S1506. The user selects the destination from the facsimile number list displayed on the LCD 60 and sets the telephone number in S1507.

If the text information that indicates the facsimile document is not recognized (NO in S1501), the recovery processor 540 wakes the image forming apparatus 1 up from the energy saving mode in S1508. Subsequently, the screen for executing the copy function is displayed, and the auxiliary parameter setting unit 560 configures the auxiliary parameters in S1509.

If the user does not hold the document (NO in S1405) and the print function is not available (NO in S1407), the image forming apparatus 1 stops operating.

If the user does not hold the document (NO in S1405) and the print function is available (YES in S1407), the print job acquisition unit 550 queries the print server 2 whether or not the print job issued by the authenticated user exists in S1601. If the print job exists, the print job is transferred to the image forming apparatus 1 (YES in S1602). Subsequently, the recovery processor 540 wakes the image forming apparatus 1 up from the energy saving mode in S1603. After executing the transferred print job, the image is formed on recording paper. If the print job does not exist (NO in S1602), the image forming apparatus 1 does not start preparing for the operation.

In the embodiments described above, on the user's way to the image forming apparatus, it is possible to specify the user by performing the facial recognition process automatically and presume the job that user wants to perform from the information on the document that the user holds. Consequently, it is possible to transition to status that the function that the user wants to use is acceptable immediately before the user reaches the image forming apparatus and reduce the user's waiting time, and that can enhance the user convenience in using the image forming apparatus.

Thus, in this embodiment, user convenience in using an image processing apparatus that implements multiple functions can be improved.

In the above description, "the preparation for the operation" is an example, and that is not limited to the recovery from the energy saving mode. "The preparation for the operation" in the present invention includes operations for starting scanning documents such as turning the light source on in the scanner unit, moving criterion white component to the starting position and so on. "The preparation for the operation" in the present invention also includes operations for starting forming images on the recording paper such as displaying screens used for executing functions described above etc.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An image forming apparatus, comprising:
an image capture device configured to capture an image of a user to generate a captured image;
a scanned data processor configured to perform at least a document scanning operation; and
circuitry configured to
determine whether or not the captured image shows that the user appearing in the captured image holds a document, and
activate the scanned data processor in response to the determination that the captured image shows that the user holds a document.

2. The image forming apparatus according to claim 1, further comprising a printer configured to form an image on a recording sheet based on a print job issued by the user,
wherein the circuitry is configured to activate the printer in response to the determination that the captured image shows that the user does not hold a document.

3. The image forming apparatus according to claim 2, wherein the scanned data processor is configured to function as a scanner that generates image data, a copier that outputs an image on recording paper, or a facsimile device that performs a facsimile function.

4. The image forming apparatus according to claim 1, wherein the circuitry is further configured to:
extract a hand region of the captured image in which a user hand appears;
extract a closed region that contacts the hand region; and
determine whether or not the closed region corresponds to a document region where a document appears.

5. The image forming apparatus according to claim 4, wherein the circuitry is further configured to:
determine a size of the document based on image characteristics in the closed region; and
determine that the captured image shows that the user does not hold a document if the determined size of the document is either larger or smaller than a predetermined document size by more than a predetermined ratio.

6. The image forming apparatus according to claim 1, wherein the scanned data processor is configured to function as a scanner that generates image data, a copier that outputs an image on recording paper, or a facsimile device that performs a facsimile function.

7. The image forming apparatus according to claim 4, wherein the circuitry is further configured to
determine a type of the document that the user holds based on image characteristics in the document region, and
set an auxiliary parameter used in accordance with the type of the document.

8. The image forming apparatus according to claim 4, wherein the circuitry is further configured to
perform a character recognition process on the document region, and
set a facsimile destination number for the image forming apparatus based on a result of the character recognition process.

9. The image forming apparatus according to claim 1, wherein the circuitry is further configured to
authenticate the user who appears in the captured image, and
prepare the scanned data processor for an allowed function in accordance with authority of the authenticated user.

10. The image forming apparatus according to claim 8, wherein the circuitry is further configured to
identify a recognized telephone number based on the result of the character recognition process,
determine if a stored destination number in stored telephone number registration data that associates identification information that identifies the user with the stored destination number corresponds to the recognized telephone number, and
set the stored destination number as the facsimile destination number when the stored destination number corresponds to the recognized telephone number.

11. The image forming apparatus according to claim 6, wherein the circuitry is further configured to
authenticate the user who appears in the captured image, and
prepare the scanned data processor for allowed functions in accordance with authority of the authenticated user.

12. The image forming apparatus according to claim 11, wherein, the circuitry is further configured to
check stored function availability data that associates identification information that identifies the user with functional information that indicates functions of the image forming apparatus available to the user, and
activate the scanned data processor when a check result indicates that a function performed by the scanned data processor is available to the user.

13. The image forming apparatus according to claim 3, wherein the circuitry is further configured to
authenticate the user who appears in the captured image, and
enable one or more functions of the scanned data processor based on information corresponding to the authenticated user.

14. The image forming apparatus according to claim 2, further comprising a print job storage that stores the print job associated with identification information that identifies the user who issued the print job,
wherein the printer is configured to obtain the print job from the print job storage.

15. The image forming apparatus according to claim 1, further comprising a rangefinder to measure a distance between the image forming apparatus and the user,
wherein the image forming apparatus is activated if the measured distance reaches a predetermined threshold distance.

16. An image forming method, comprising:
capturing an image of a user to generate a captured image;
determining whether or not the captured image shows that the user appearing in the captured image holds a document; and
activating a scanned data processor in response to the determination that the captured image shows that the user holds a document, the scanned data processor being configured to perform at least a document scanning operation.

17. A non-transitory, computer-readable recording medium storing a program that, when executed by a computer, causes a processor of the computer to implement an image forming method, the method comprising:
capturing an image of a user to generate a captured image;
determining whether or not the captured image shows that the user appearing in the captured image holds a document; and activating a scanned data processor in response to the determination that the captured image shows that the user holds a document, the scanned data processor being configured to perform at least a document scanning operation.

18. The image forming method according to claim 16, further comprising:

in response to the determination that the captured image shows that the user holds a document, determining a document type of the document held by the user based on the captured image;

in response to the determination that the captured image shows that the user holds a document and a determination that the document type of the document held by the user is for facsimile, activating a facsimile function of the scanned data processor; and in response to the determination that the captured image shows that the user holds a document and a determination that the document type of the document held by the user is not for facsimile, activating a copying function of the scanned data processor.

19. The image forming apparatus according to claim 1, wherein the circuitry is further configured to activate a facsimile function without activating a printing function in response to the determination that the captured image shows that the user holds a document, and activate the printing function in response to the determination that the captured image shows that the user does not hold a document.

20. The image forming method according to claim 16, further comprising:

activating a facsimile function without activating a printing function in response to the determination that the captured image shows that the user holds a document; and activating the printing function in response to the determination that the captured image shows that the user does not hold a document.

* * * * *